United States Patent
Huang et al.

(10) Patent No.: US 11,006,270 B2
(45) Date of Patent: May 11, 2021

(54) METHOD AND DEVICE FOR USE IN REPORTING TERMINAL CAPABILITY

(71) Applicant: CLOUDMINDS (SHENZHEN) ROBOTICS SYSTEMS CO., LTD., Guangdong (CN)

(72) Inventors: William Xiao-qing Huang, Guangdong (CN); Zhenkai Wang, Guangdong (CN); Haitao Jiang, Guangdong (CN)

(73) Assignee: CLOUDMINDS (SHANGHAI) ROBOTICS SYSTEMS CO., LTD., Shanghai (CN)

( * ) Notice: Subject to any disclaimer, the term of this patent is extended or adjusted under 35 U.S.C. 154(b) by 5 days.

(21) Appl. No.: 16/542,390

(22) Filed: Aug. 16, 2019

(65) Prior Publication Data

US 2019/0373452 A1 Dec. 5, 2019

Related U.S. Application Data (63) Continuation of application No. PCT/CN2017/093049, filed on Jul. 14, 2017.

(51) Int. Cl.
*H04W 8/24* (2009.01)
*H04W 72/12* (2009.01)

(52) U.S. Cl.
CPC ......... *H04W 8/24* (2013.01); *H04W 72/1268* (2013.01)

(58) Field of Classification Search
CPC ............. H04W 72/0453; H04W 24/10; H04W 72/048; H04W 72/1268; H04W 8/24; H04W 72/12
(Continued)

(56) References Cited

U.S. PATENT DOCUMENTS 9,226,136 B2 * 12/2015 Kim .................. H04W 8/24
10,103,865 B2 * 10/2018 Takeda .............. H04W 72/042
(Continued)

FOREIGN PATENT DOCUMENTS

CN  101212251 A  7/2008
CN  101568059 A  10/2009
(Continued)

OTHER PUBLICATIONS

International Search Report (and English translation) and Written Opinion of the International Searching Authority for International Application No. PCT/CN2017/093049 dated Mar. 27, 2018.
(Continued)

*Primary Examiner* — Man U Phan
(74) *Attorney, Agent, or Firm* — Heslin Rothenberg Farley & Mesiti P.C.

(57) ABSTRACT

A method and device for use in reporting terminal capability, the method including: determining a frequency band pairing combination in an operating band that is supported by a terminal-side equipment, the frequency band pairing combination being composed of a first frequency band that consists of a first uplink operating frequency range and a first downlink operating frequency range as well as a supplementary uplink frequency band that consists of one or more second uplink frequency ranges; determining terminal capability information of the terminal-side equipment within the frequency band pairing combination, the terminal capability information including a first frequency band identifier, terminal uplink capability information and terminal downlink capability information that correspond to the first frequency band, as well as a supplementary uplink frequency band identifier and terminal uplink capability information that corresponds to a supplementary uplink frequency band;

(Continued)

reporting the terminal capability information to a network-side equipment.

16 Claims, 4 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,158,989 B2* | 12/2018 | Kim | H04W 28/04 |
| 10,462,800 B2* | 10/2019 | Lee | H04W 24/10 |
| 10,631,159 B2* | 4/2020 | Chakraborty | H04W 48/16 |
| 10,721,717 B2* | 7/2020 | Gholmieh | H04W 72/042 |
| 2005/0174954 A1 | 8/2005 | Yun et al. | |
| 2017/0339554 A1* | 11/2017 | Chen | H04L 5/001 |
| 2017/0367073 A1* | 12/2017 | Murugan | H04B 1/0053 |
| 2020/0029347 A1* | 1/2020 | Huang | H04W 72/048 |
| 2020/0029377 A1* | 1/2020 | Chow | H04W 24/08 |
| 2020/0213836 A1* | 7/2020 | Kim | H04W 8/24 |
| 2020/0260265 A1* | 8/2020 | Jin | H04W 72/048 |
| 2020/0314932 A1* | 10/2020 | Jin | H04W 8/24 |

FOREIGN PATENT DOCUMENTS

| | | |
|---|---|---|
| CN | 101588201 A | 11/2009 |
| CN | 101605334 A | 12/2009 |
| CN | 102300213 A | 12/2011 |
| CN | 104811411 A | 7/2015 |
| WO | 2012118839 A1 | 9/2012 |

OTHER PUBLICATIONS

Examination Report for Chinese Patent Application No. 201780002220.X dated Jun. 2, 2020.

* cited by examiner

METHOD AND DEVICE FOR USE IN REPORTING TERMINAL CAPABILITY

CROSS-REFERENCE TO RELATED APPLICATION

The present disclosure is a continuation of International application No. PCT/CN2017/093049, filed on Jul. 14, 2017, which is incorporated herein by reference in its entirety.

TECHNICAL FIELD

The present disclosure relates to the field of communication, especially a method and device for use in reporting terminal capability.

BACKGROUND

In the 3G and 4G networks, uplink coverage of a system has worse coverage capability than downlink coverage does, which affects transmission of uplink data. In the 5G network, the contrast between the uplink coverage and the downlink coverage is more obvious, especially for the uplink coverage of a high-frequency band, which can seriously affect a user's experience. Therefore, it is necessary to consider using both high and low frequency bands in coordination, and to perform data transmission using an uplink frequency within a low frequency band when uplink coverage within a high frequency band is limited.

A new way of using frequency is to pair a carrier within a high frequency band with a carrier within a low frequency band, that is, to configure two independent frequency bands into a natural frequency pair. It is unnecessary to activate a secondary carrier or to deactivate a secondary carrier in a manner similar to carrier aggregation, so as to avoid configuration delay and complexity overhead during of the carrier aggregation.

Particularly, an uplink frequency band (TDD format) of 3300-3800 MHz and an uplink frequency band of 880-915 MHz (FDD format) are paired in use. In this case, for a system, a downlink data is carried within the 3300-3800 MHz frequency range, and an uplink data is carried within the 880-915 MHz and/or the 880-915 MHz frequency band. Particularly, when a terminal is at the cell center, the uplink data may be carried by the frequency range of 3300-3800 MHz, and when the terminal is at the cell edge, the uplink data may be carried by the frequency range of 880-915 MHz. Therefore, a single terminal works only at one uplink frequency, while a network device can work at a plurality of uplink frequencies, which not only ensures coverage of the terminal by the network, but also avoids power consumption of the terminal.

However, in the new way of using a frequency, a radio frequency capability of a terminal in different frequency ranges may be varied, and it has become an issue as to how a network device provides a terminal with correct data scheduling.

SUMMARY

The main objective of embodiments of the present disclosure is to provide a method and device for use in reporting terminal capability. The method and device may clearly and quickly inform of relevant capability of a network device terminal in a new way of frequency pairing, so that the network device may perform correct data scheduling for the terminal.

In order to achieve the above-described objective, a first aspect of the embodiments of the present disclosure provides a method for use in reporting terminal capability, the method including:

a frequency band pairing combination is determined in an operating band that is supported by a terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

terminal capability information of the terminal-side equipment in the frequency band pairing combination is determined, wherein the terminal capability information includes a first frequency band identifier, terminal uplink capability information and terminal downlink capability information that correspond to the first frequency band, as well as a supplementary uplink frequency band identifier and terminal uplink capability information that corresponds to the supplementary uplink frequency band;

the terminal capability information is reported to a network-side equipment.

A second aspect of the embodiments of the present disclosure provides another method for use in reporting terminal capability, the method including:

terminal capability information of a frequency band pairing combination used by a terminal-side equipment is received, the terminal capability information being sent by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

the terminal-side equipment is scheduled for transmitting uplink data within an uplink operating frequency range within the frequency band pairing combination, and/or receiving downlink data within a downlink operating frequency range in the frequency band pairing combination in accordance with the terminal capability information.

A third aspect of the embodiments of the present disclosure provides a device for use in reporting terminal capability, the device being applied to a terminal-side equipment and the device including:

a first determining module which is configured to determine a frequency band pairing combination in an operating band that is supported by a terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

a second determining module which is configured to determine terminal capability information of the terminal-side equipment in the frequency band pairing combination, the terminal capability information including a first frequency band identifier, terminal uplink capability information and terminal downlink capability information that correspond to the first frequency band, as well as a supplementary uplink frequency band identifier and terminal uplink capability information that corresponds to the supplementary uplink frequency band;

a reporting module which is configured to report the terminal capability information to a network-side equipment.

A fourth aspect of the embodiments of the present disclosure provides a device for use in reporting terminal capability, the device being applied to a network-side equipment and the device including:

a receiving module which is configured to receive terminal capability information of a frequency band pairing combination used by a terminal-side equipment, the terminal capability information being sent by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

a scheduling module which is configured to schedule the terminal-side equipment for transmitting uplink data within an uplink operating frequency range in the frequency band pairing combination, and/or to receive downlink data within a downlink operating frequency range in the frequency band pairing combination in accordance with the terminal capability information.

A fifth aspect of the embodiments of the present disclosure provides a non-temporary computer readable storage medium, wherein the non-temporary computer readable storage medium includes one or more programs configured to implement the method in accordance with the first aspect.

A sixth aspect of the embodiments of the present disclosure provides a non-temporary computer readable storage medium, wherein the non-temporary computer readable storage medium includes one or more programs configured to implement the method in accordance with the second aspect.

A seventh aspect of the embodiments of the present disclosure provides a terminal-side equipment, including a non-temporary computer readable storage medium in accordance with the fifth aspect; and one or more processors which are configured to implement a program in the non-temporary computer readable storage medium.

An eighth aspect of the embodiments of the present disclosure provides a network-side equipment, including a non-temporary computer readable storage medium in accordance with the sixth aspect; and one or more processors which are configured to implement a program in the non-temporary computer readable storage medium.

Through the above-described technical solution, in a new way of using frequency pairing, the terminal-side equipment, after determining a frequency band pairing combination used in a pair, obtains terminal capability information of the terminal-side equipment in the frequency band pairing combination, and reports the terminal capability information to the network-side equipment. In this way, although the radio frequency capability of the terminal may vary in different frequency ranges, the network-side equipment may clearly know the capability of the terminal-side equipment through the reporting of the terminal-side equipment, and the network-side equipment may perform correct data scheduling on the terminal-side equipment in accordance with the terminal capability information.

DETAILED DESCRIPTION

Embodiments of the present disclosure are described with reference to the drawings. It shall be appreciated that the embodiments described herein are merely for describing and illustrating, rather than imposing a limitation to, the present disclosure.

The technical solutions provided in the following embodiments of the present disclosure may be applied to the 5G mobile communications system. The system may include a network-side equipment and a terminal-side equipment. The network-side equipment may be a base station (BS). Herein, the base station is a device communicating with the terminal-side equipment, and may provide communication coverage of a particular physical region. For example, the BS may be an evolutional node B (ENB or eNodeB) in LTE, or may be another access network device that provides an access service in a wireless communications network.

The terminal-side equipment may be distributed in an entire mobile communications system. Each terminal-side equipment may be stationary or mobile. For example, the terminal-side equipment may be a mobile station, a subscriber unit, a station or a wireless communications device such as a cellular phone, a personal digital assistant (PDA), a handheld, or a laptop computer.

Figure 1:
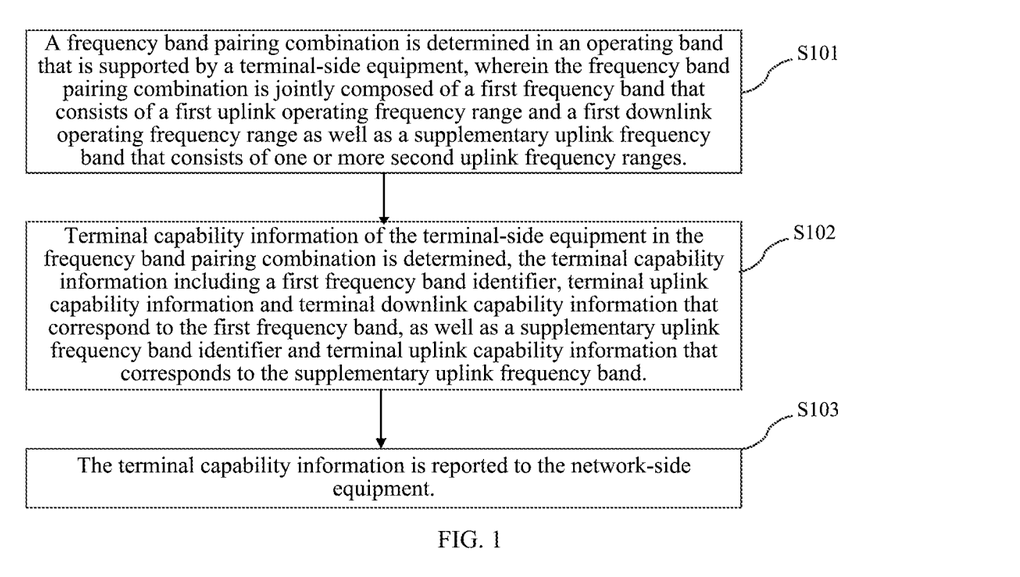
FIG. 1 is a flowchart showing a method for use in reporting terminal capability in an embodiment of the present disclosure.

Embodiments of the present disclosure provide a method for use in reporting terminal capability. The method is applied to a terminal-side equipment. As shown in FIG. 1, the method includes the following.

In S101: A frequency band pairing combination is determined in an operating band that is supported by a terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges.

For example, a first frequency band that consists of a first uplink operating frequency range and a first downlink operating frequency range is determined within an uplink operating frequency range and a downlink operating frequency range supported by the terminal-side equipment. Further, the supplementary uplink frequency band may be obtained by determining at least one second uplink operating frequency range within an uplink operating frequency range supported by the terminal-side equipment beyond the first uplink operating frequency range. The first frequency band and the supplementary uplink frequency band constitute the frequency band pairing combination.

For example, the first uplink operating frequency range may be an uplink frequency range of 3300-3800 MHz and of the TDD (Time Division Duplexing) format. The first downlink operating frequency range may be a downlink frequency range of 3300-3800 MHz and of the TDD format. The supplementary uplink frequency band may include a second uplink frequency range of 880-915 MHz and of the FDD (Frequency Division Duplexing) format.

It shall be noted that in the 5G mobile communication system, in order to make up for the defect that the uplink coverage range of a high frequency band per se is limited, a low frequency uplink operating frequency range may be selected upon selecting a supplementary uplink frequency band, which may be determined in accordance with an actual need and to which the present disclosure is not limited in practice.

In S102: Terminal capability information of the terminal-side equipment in the frequency band pairing combination is determined, the terminal capability information including a first frequency band identifier, terminal uplink capability information and terminal downlink capability information that correspond to the first frequency band, as well as a supplementary uplink frequency band identifier and terminal uplink capability information that corresponds to the supplementary uplink frequency band.

In particular, the terminal capability information may be information related to the terminal-side capability and configured in advance in the terminal-side equipment, or may be information related to the terminal-side equipment capability and configured in accordance with a practical need, or capability information of the terminal-side equipment relating to hardware, or capability information of the terminal-side equipment relating to software.

In S103: The terminal capability information is reported to the network-side equipment.

Through the above-described method, in a new way of using frequency pairing, the terminal-side equipment, after determining a frequency band pairing combination used in a pair, obtains terminal capability information of the terminal-side equipment in the frequency band pairing combination, and reports the terminal capability information to the network-side equipment. In this way, although the radio frequency capability of the terminal may vary in different frequency ranges, the network-side equipment may clearly know the capability of the terminal-side equipment through the reporting of the terminal-side equipment, and the network-side equipment may perform correct data scheduling on the terminal-side equipment in accordance with the terminal capability information. For example, transmission of uplink and downlink data of the terminal-side equipment is correctly scheduled by determining an uplink scheduling resource in accordance with the terminal uplink capability information and by determining the downlink scheduling resource in accordance with the terminal downlink capability information.

In particular, the terminal uplink capability information includes at least one of the following types of information of the terminal-side equipment within an uplink operating frequency range: a terminal transmission power level, a modulation mode supported by the uplink, and the number of layers supported by the uplink multiple-input multiple-output technology.

Herein, the terminal uplink capability information is the terminal uplink capability information of the first uplink operating frequency range in the first frequency band, and the terminal capability information of each uplink operating frequency range in the supplementary uplink frequency band. Herein, the terminal uplink capability information of each uplink operating frequency range includes one or more of a terminal transmission power level, a modulation mode supported by the uplink, and the number of layers supported by the uplink multiple-input multiple-output technology.

The terminal downlink capability information includes at least one of the following types of information of the terminal-side equipment in a downlink operating frequency range: a modulation mode supported by the downlink, and the number of layers supported by the downlink multiple-input multiple-output technology.

That is, the terminal capability information includes an identifier of the first frequency band, and one or more of the modulation manner supported by the downlink within the first downlink operating frequency range in the first frequency band and the number of layers supported by the downlink multiple-input multiple-output technology.

In one possible embodiment of the present disclosure, the terminal capability information further includes a frequency band pairing combination identifier and at least one of the following types of information corresponding to the frequency band pairing combination:

first information indicating whether the terminal-side equipment supports synchronously performing uplink data transmission within the first uplink operating frequency range of the first frequency band contained in the frequency band pairing combination and a second uplink operating frequency range contained in the supplementary uplink frequency band. Herein, the first information is for the network-side equipment to determine whether data can be scheduled for the terminal-side equipment within the first uplink operating frequency range and the second uplink operating frequency range synchronously;

second information indicating whether the terminal-side equipment supports data reception within the first downlink operating frequency range of the first frequency band while performing data transmission within the second uplink operating frequency range of the supplementary uplink frequency band in the frequency band pairing combination. The second information is configured for the network-side equipment to determine whether to schedule the terminal-side equipment to transmit uplink data within the second uplink operating frequency range while scheduling the terminal-side equipment to receive downlink data within the first downlink operating frequency range;

third information indicating whether the terminal-side equipment shall be configured with a separation when transmitting data within the second uplink operating frequency range in the frequency band pairing combination, the separation being configured for the terminal-side equipment to transmit an uplink reference signal within the first uplink operating frequency range contained in the first frequency band. The third information is for the network-side equipment to determine whether to configure a separation when the terminal-side equipment transmits data in the second uplink operating frequency range.

Figure 2:
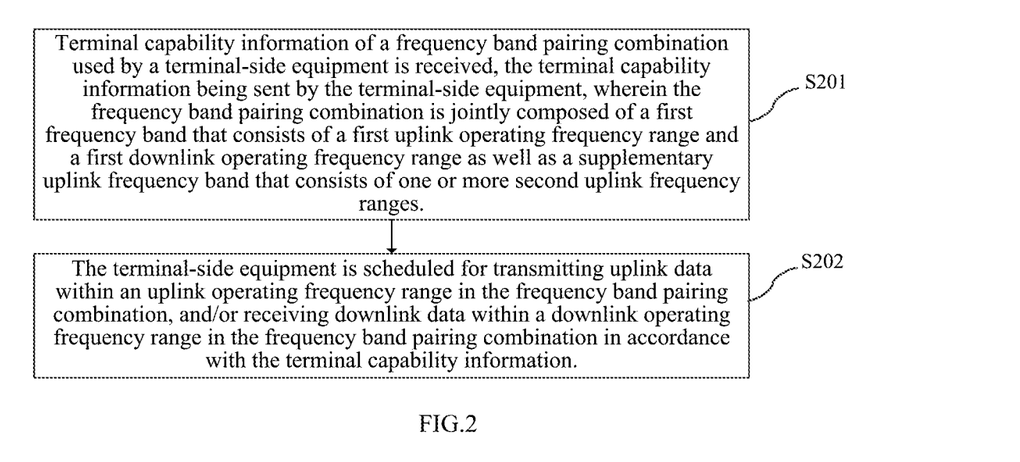
FIG. 2 is a flowchart showing another method for use in reporting terminal capability in an embodiment of the present disclosure.

Embodiments of the present disclosure further provide another method for use in reporting terminal capability. The method is applied to a network-side equipment. As shown in FIG. 2, the method further includes the following.

In S201, terminal capability information of a frequency band pairing combination used by a terminal-side equipment is received, the terminal capability information being sent by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges.

In S202, the terminal-side equipment is scheduled for transmitting uplink data within an uplink operating frequency range in the frequency band pairing combination, and/or receiving downlink data within a downlink operating frequency range in the frequency band pairing combination in accordance with the terminal capability information.

Through the above-described method, in a new way of using frequency pairing, the network-side equipment may receive the terminal capability information reported by the terminal-side equipment. The terminal capability information represents radio frequency capability of the terminal-side equipment in varied frequency ranges in the frequency band pairing combination used in pairs. Therefore, the network-side equipment may clearly know the capability of the terminal-side equipment, and perform correct data scheduling on the terminal-side equipment on the basis of the terminal capability information.

In particular, the terminal capability information includes first frequency band identifier, terminal uplink capability information and terminal downlink capability information corresponding to the first frequency band, as well as a supplementary uplink frequency band identifier, the terminal uplink capability information corresponding to the supplementary uplink frequency band. Accordingly, the above-described step S202 specifically includes: determining an uplink scheduling resource according to the terminal uplink capability information, and/or determining a downlink scheduling resource according to the terminal downlink capability information.

Alternatively, the terminal uplink capability information may include the following information of the terminal-side equipment within the uplink operating frequency range: a terminal transmission power level, a modulation mode supported by the uplink, and the number of layers supported by the uplink multiple-input multiple-output technology. Accordingly, the uplink scheduling resource includes the following resources: an uplink frequency, a transmission bandwidth, a modulation manner, the number of layers of the multiple-input multiple-output technology, and transmission power.

Alternatively, the terminal downlink capability information includes the following information of the terminal-side equipment in a downlink operating frequency range: a modulation mode supported by the downlink, and the number of layers supported by the downlink multiple-input multiple-output technology. Accordingly, the downlink scheduling resource includes the following resources: a downlink frequency, a downlink bandwidth, a modulation manner, the number of layers of the multiple-input multiple-output technology.

In a possible embodiment of the present disclosure, the terminal capability information further includes a frequency band pairing combination identifier, and first information corresponding to the frequency band pairing combination, the first information indicating whether the terminal-side equipment supports synchronously performing uplink data transmission within the first uplink operating frequency range and a second uplink operating frequency range.

In this case, the above-described step S202 further includes: determining that data is able to be synchronously scheduled for the terminal-side equipment within the first uplink operating frequency range and the second uplink operating frequency range, when the first information indicates that the terminal-side equipment supports synchronous uplink data transmission in the first uplink operating frequency range and the second uplink operating frequency range; determining that data is not able to be synchronously scheduled for the terminal-side equipment within the first uplink operating frequency range and the second uplink operating frequency range, when the first information indicates that the terminal-side equipment does not support synchronous uplink data transmission in the first uplink operating frequency range and the second uplink operating frequency range.

In another possible embodiment of the present disclosure, the terminal capability information further includes the frequency band pairing combination identifier and second information corresponding to the frequency band pairing combination, the second information indicating whether the terminal-side equipment supports data reception within the first downlink operating frequency range while supporting data transmission within the second uplink operating frequency range.

In this case, the above-described step S202 further includes: determining that the terminal-side equipment is able to be scheduled to receive data within the first downlink operating frequency range while the terminal-side equipment is performing data transmission within the second uplink operating frequency range, when the second information indicates that the terminal-side equipment supports data reception within the first downlink operating frequency range while performing data transmission within the second uplink operating frequency range; determining that the terminal-side equipment is not able to be scheduled to receive data within the first downlink operating frequency range while scheduling the terminal-side equipment to perform data transmission within the second uplink operating frequency range, when the second information indicates that the terminal-side equipment does not support data reception within the first downlink operating frequency range while performing data transmission within the second uplink operating frequency range; or determining that the terminal-side equipment is not able to be scheduled to perform data transmission within the second uplink operating frequency range while the terminal-side equipment is scheduled to receive data within the first downlink operating frequency range, when the second information indicates that the terminal-side equipment does not support data reception within the first downlink operating frequency range while performing data transmission within the second uplink operating frequency range.

In another possible embodiment of the present disclosure, the terminal capability information further includes the frequency band pairing combination identifier and third information corresponding to the frequency band pairing combination, the third information indicating whether a separation needs to be configured when the terminal-side equipment transmits data within the second uplink operating frequency range, and the separation being configured for the terminal-side equipment to transmit an uplink reference signal within the first uplink operating frequency range.

In this case, the above-described step S202 further includes: determining that the separation needs to be configured when the terminal-side equipment transmits data within the second uplink operating frequency range, if the separation needs to be configured when the third information indicates that the terminal-side equipment transmits data within the second uplink operating frequency range, wherein in a time window of the separation, the terminal-side equipment transmits an uplink reference signal within the first uplink operating frequency range but stops transmitting data within the second uplink operating frequency range; determining that the separation does not need to be configured when the terminal-side equipment transmits data within the second uplink operating frequency range, if the separation does not need to be configured when the third information indicates that the terminal-side equipment transmits data within the second uplink operating frequency range.

In implementation, the terminal capability information may include one or more of the first information, the first information, and the third information, to which the present disclosure does not impose a limitation.

It is known from the method for use in reporting terminal capability with reference to FIG. 1 and FIG. 2 that in a new way of using frequency pairing, with regard to the problem that the radio frequency capability of the terminal in different frequency ranges may be varied results in that the network-side equipment fails to perform correct data scheduling for the terminal, this disclosure obtains the terminal capability information of the frequency band pairing combination through the terminal-side equipment. The terminal capability information presents the radio frequency capability of the terminal-side equipment in different frequency ranges of the frequency band pairing combination, and that the terminal capability information is reported to the network-side equipment, so that the network-side equipment may clearly know the capability of the terminal-side equipment, and perform correct data scheduling on the terminal-side equipment on the basis of the terminal capability information.

Figure 3:
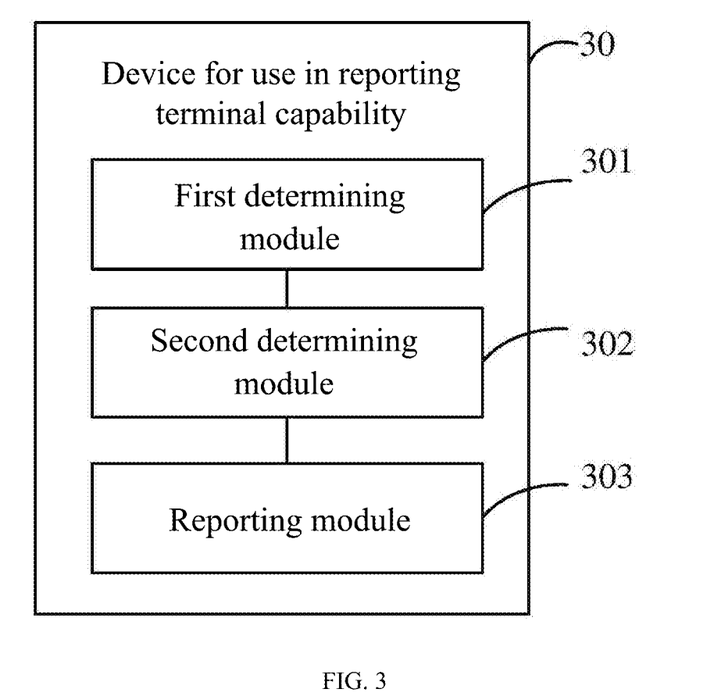
FIG. 3 is a schematic structural view showing a device for use in reporting terminal capability in an embodiment of the present disclosure.

Embodiments of the present disclosure further provide a device 30 for use in reporting terminal capability. The device 30 is applied to a terminal-side equipment for implementing the method steps for use in reporting terminal capability as provided in the method embodiment shown in FIG. 1. As shown in FIG. 3, the device 30 includes:

a first determining module 301 which is configured to determine a frequency band pairing combination in an operating band that is supported by a terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

a second determining module 302 which is configured to determine terminal capability information of the terminal-side equipment in the frequency band pairing combination, the terminal capability information including a first frequency band identifier, terminal uplink capability information and terminal downlink capability information that correspond to the first frequency band, as well as a supplementary uplink frequency band identifier and terminal uplink capability information that corresponds to the supplementary uplink frequency band;

a reporting module 303 which is configured to report the terminal capability information to a network-side equipment.

Alternatively, the terminal uplink capability information includes at least one of the following types of information of the terminal-side equipment within an uplink operating frequency range:

a terminal transmission power level, a modulation mode supported by the uplink, and the number of layers supported by the uplink multiple-input multiple-output technology.

Alternatively, the terminal downlink capability information includes at least one of the following types of information of the terminal-side equipment in a downlink operating frequency range:

a modulation mode supported by the downlink, and the number of layers supported by the downlink multiple-input multiple-output technology.

Alternatively, the terminal capability information further includes a frequency band pairing combination identifier and at least one of the following types of information corresponding to the frequency band pairing combination:

first information indicating whether the terminal-side equipment supports synchronously performing uplink data transmission within the first uplink operating frequency range and a second uplink operating frequency range;

second information indicating whether the terminal-side equipment supports data reception within the first downlink operating frequency range while performing data transmission within the second uplink operating frequency range;

third information indicating whether the terminal-side equipment shall be configured with a separation when transmitting data within the second uplink operating frequency range, the separation being configured for the terminal-side equipment to transmit an uplink reference signal within the first uplink operating frequency range.

It shall be noted that those skilled in the art may clearly know that in order to facilitate and simplify description, examples are given for only describing the functional modules. In practical applications, the above-described functions may be implemented by varied functional modules in accordance with what is needed. That is, all or some of the above-described functions described above are implemented by dividing the inner structure of the device into varied functional modules. For particular operation of the above-described functional modules, the corresponding processes in the method embodiments described above may be referred to and is not herein repeated.

Through the above-described device, in a new way of using frequency pairing, the terminal-side equipment, after determining a frequency band pairing combination used in a pair, obtains terminal capability information of the terminal-side equipment in the frequency band pairing combination, and reports the terminal capability information to the network-side equipment. In this way, although the radio frequency capability of the terminal may vary in different frequency ranges, the network-side equipment may clearly know the capability of the terminal-side equipment through the reporting of the terminal-side equipment, and the network-side equipment may perform correct data scheduling on the terminal-side equipment in accordance with the terminal capability information.

Figure 4:
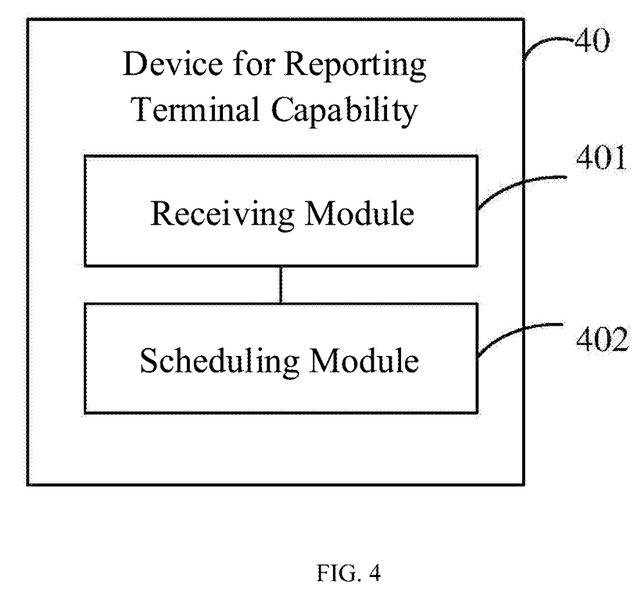
FIG. 4 is a schematic structural view showing another device for use in reporting terminal capability in an embodiment of the present disclosure.

Embodiments of the present disclosure further provide a device 40 for use in reporting terminal capability. The device 40 is applied to a terminal-side equipment for implementing the method steps for use in reporting terminal capability provided by method embodiments as shown in FIG. 2. As shown in FIG. 4, the device 40 includes:

a receiving module 401, configured to receive terminal capability information of a frequency band pairing combination used by a terminal-side equipment, the terminal capability information being sent by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

a scheduling module 402, configured to schedule the terminal-side equipment for transmitting uplink data within an uplink operating frequency range in the frequency band pairing combination, and/or to receive downlink data within a downlink operating frequency range in the frequency band pairing combination in accordance with the terminal capability information.

Alternatively, the terminal capability information includes first frequency band identifier, terminal uplink capability information and terminal downlink capability information corresponding to the first frequency band, as well as a supplementary uplink frequency band identifier and the terminal uplink capability information corresponding to the supplementary uplink frequency band. Accordingly, the scheduling module is configured to determine an uplink scheduling resource according to the terminal uplink capability information, and/or determine a downlink scheduling resource according to the terminal downlink capability information.

Alternatively, the terminal uplink capability information includes the following information of the terminal-side equipment within the uplink operating frequency range: a terminal transmission power level, a modulation mode supported by the uplink, and the number of layers supported by the uplink multiple-input multiple-output technology. Accordingly, the uplink scheduling resource includes the following resources: an uplink frequency, a transmission bandwidth, a modulation manner, the number of layers of the multiple-input multiple-output technology, and transmission power.

Alternatively, the terminal downlink capability information includes the following information of the terminal-side equipment within a downlink operating frequency range: a modulation mode supported by the downlink, and the number of layers supported by the downlink multiple-input multiple-output technology. Accordingly, the downlink scheduling resource includes the following resources: a downlink frequency, a downlink bandwidth, a modulation manner, the number of layers of the multiple-input multiple-output technology.

Alternatively, the terminal capability information further includes a frequency band pairing combination identifier and first information corresponding to the frequency band pairing combination, the first information indicating whether the terminal-side equipment supports synchronously performing uplink data transmission within the first uplink operating frequency range and the second uplink operating frequency range. Accordingly, the scheduling module 402 is configured to:

determine that data is able to be synchronously scheduled for the terminal-side equipment within the first uplink operating frequency range and the second uplink operating frequency range, when the first information indicates that the terminal-side equipment supports synchronous uplink data transmission in the first uplink operating frequency range and the second uplink operating frequency range; the scheduling module is configured to determine that data is not able to be synchronously scheduled for the terminal-side equipment within the first uplink operating frequency range and the second uplink operating frequency range, when the first information indicates that the terminal-side equipment does not support synchronous uplink data transmission in the first uplink operating frequency range and the second uplink operating frequency range.

Alternatively, the terminal capability information further includes the frequency band pairing combination identifier and second information corresponding to the frequency band pairing combination, the second information indicating whether the terminal-side equipment supports data reception within the first downlink operating frequency range while supporting data transmission within the second uplink operating frequency range. Accordingly, the scheduling module 402 is configured to:

determine that the terminal-side equipment is able to be scheduled to receive data within the first downlink operating frequency range while terminal-side equipment is performing data transmission within the second uplink operating frequency range, if the second information indicates that the terminal-side equipment supports data reception within the first downlink operating frequency range while performing data transmission within the second uplink operating frequency range; determine that the terminal-side equipment is not able to be scheduled to receive data within the first downlink operating frequency range while scheduling the terminal-side equipment to perform data transmission within the second uplink operating frequency range, if the second information indicates that the terminal-side equipment does not support data reception within the first downlink operating frequency range while performing data transmission within the second uplink operating frequency range; or determine that the terminal-side equipment is not able to be scheduled to perform data transmission within the second uplink operating frequency range while the terminal-side equipment is scheduled to receive data within the first downlink operating frequency range, if the second information indicates that the terminal-side equipment does not support data reception within the first downlink operating frequency range while performing data transmission within the second uplink operating frequency range.

Alternatively, the terminal capability information further includes the frequency band pairing combination identifier and third information corresponding to the frequency band pairing combination, the third information indicating whether a separation needs to be configured when the terminal-side equipment transmits data within the second uplink operating frequency range, and the separation being configured for the terminal-side equipment to transmit an uplink reference signal within the first uplink operating frequency range. Accordingly, the scheduling module is configured to:

determine that the separation needs to be configured when the terminal-side equipment transmits data within the second uplink operating frequency range, if the third information indicates that the separation needs to be configured when the terminal-side equipment transmits data within the second uplink operating frequency range, wherein in a time window of the separation, the terminal-side equipment transmits an uplink reference signal within the first uplink operating frequency range but stops transmitting data within the second uplink operating frequency range; determine that the separation does not need to be configured when the terminal-side equipment transmits data within the second uplink operating frequency range, if the third information indicates that the separation does not need to be configured when the terminal-side equipment transmits data within the second uplink operating frequency range.

It shall be noted that those skilled in the art may clearly know that in order to facilitate and simplify description, examples are given for only describing the functional modules. In practical applications, the above-described functions may be implemented by varied functional modules in accordance with what is needed. That is, all or some of the above-described functions described above are implemented by dividing the inner structure of the device into varied functional modules. For particular operation of the above-described functional modules, the corresponding processes in the method embodiments described above may be referred to and is not herein repeated.

Through the above-described device, in a new way of using frequency pairing, the network-side equipment may receive the terminal capability information reported by the terminal-side equipment. The terminal capability information represents radio frequency capability of the terminal-side equipment in varied frequency ranges in the frequency band pairing combination used in pairs. Therefore, the network-side equipment may clearly know the capability of the terminal-side equipment, and perform correct data scheduling on the terminal-side equipment on the basis of the terminal capability information.

Figure 5:
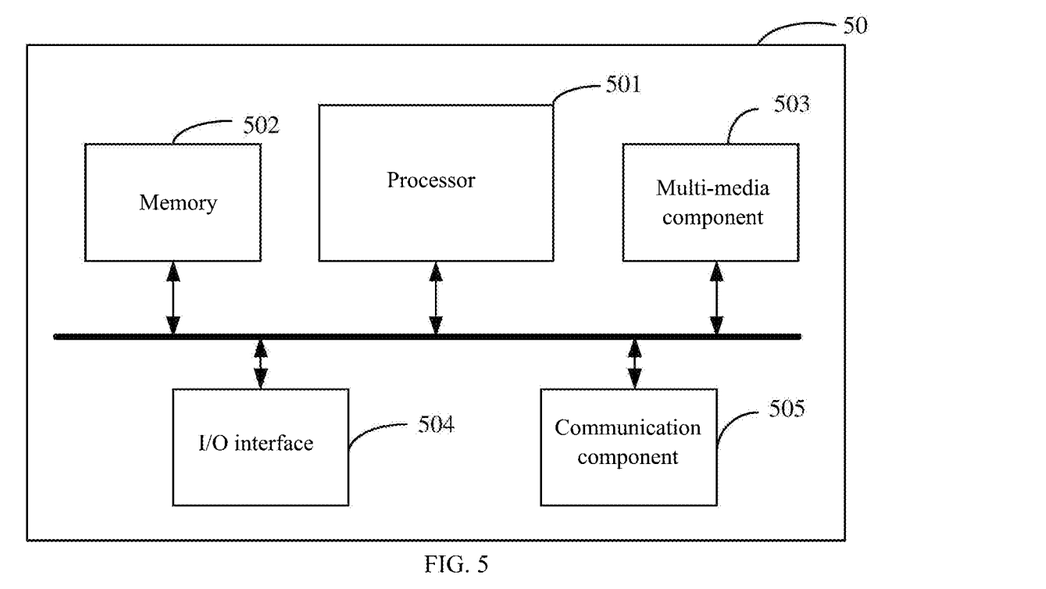
FIG. 5 is a schematic structural view showing another device for use in reporting terminal capability in an embodiment of the present disclosure.

FIG. 5 is a schematic structural view showing a device 50 for use in reporting terminal capability as provided in an embodiment of the present disclosure. The device 50 may be provided as a terminal-side equipment. As shown in FIG. 5, the device 50 may include: a processor 501, a memory 502, a multi-media component 503, an input/output (I/O) interface 504 and a communication component 505.

Herein, the processor 505 is configured to control general operation on the device 50, so as to complete all or some steps of the above-described method for use in reporting terminal capability. The memory 502 is configured to store various types of data to support operation on the device 500. The data may include an instruction on any application or method operated on the device 500.

The memory 502 may be implemented by any type of volatile or non-volatile memory terminal devices such as a static random access memory (SRAM), an electrically erasable programmable read-only memory (EPROM), a programmable read-only memory (PROM), a read-only memory (ROM), a magnetic memory, a flash memory, a magnetic disc or an optical disc, or by combination thereof.

The multi-media component 503 may include a screen and an audio component. Herein, the screen may be, for example, a touch screen, and the audio visual component is configured to out and/or input an audio signal.

The communication component 505 is configured to perform wired or wireless communications with another equipment. Wireless communication can be, for example, Wi-Fi, Bluetooth, Near Field Communication (NFC), 2G, 3G or 4G, or one or a combination thereof. Therefore, correspondingly, the communication component 505 may include a Wi-Fi module, a Bluetooth module, or an NFC module.

In one possible embodiment, the device 50 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or another electronic element for implementing the above-described method for use in reporting terminal capability.

Figure 6:
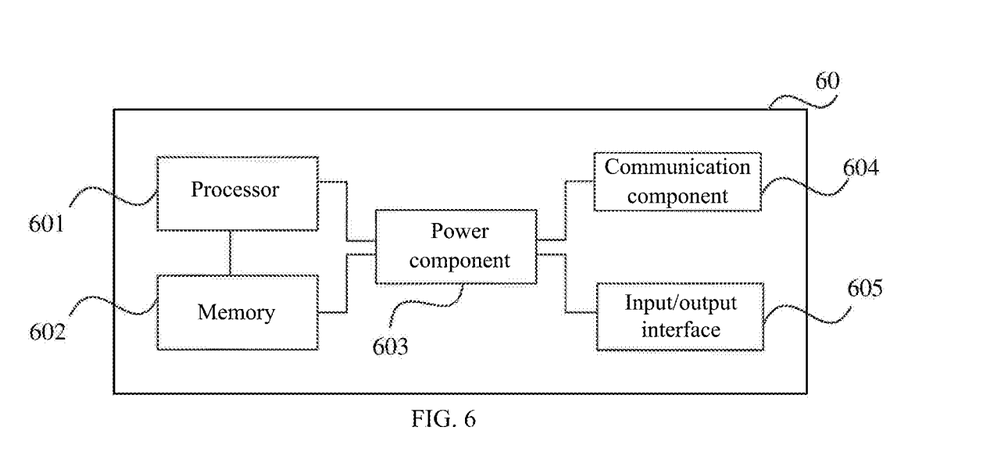
FIG. 6 is a schematic structural view showing another device for use in reporting terminal capability in an embodiment of the present disclosure.

FIG. 6 is another schematic structural view showing a device 60 for use in reporting terminal capability as provided in an embodiment of the present disclosure. The device 60 may be provided as a network-side equipment. As shown in FIG. 6, the device 60 includes a processor 601 which may be one or more, and a memory 602 for storing a computer program that may be implemented by the processor 601. The computer program stored in the memory 602 may include one or more modules each corresponding to one group of instructions. Besides, the processor 602 may be configured to implement the computer program to implement the above-described method for use in reporting terminal capability.

Further, the device 60 may include a power component 603 and a communication component 604. The power component 603 may be configured to implement power management of the device 60. The communication component 604 may be configured to implement communication of the device 60, for example, wired or wireless communication. Further, the device 60 may further include an input/output (I/O) interface 605. The device 60 may operate based on an operation system such as Windows Server™, Mac OS X™, Unix™ and Linux™ stored in the memory 602.

Embodiments of the present disclosure further provides a non-temporary computer readable storage medium 1, wherein the non-temporary computer readable storage medium 1 includes one or more programs configured to implement a method for use in reporting terminal capability. The method is applied to a terminal-side equipment, including:

a frequency band pairing combination is determined in an operating band that is supported by a terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

terminal capability information of the terminal-side equipment in the frequency band pairing combination is determined, the terminal capability information including a first frequency band identifier, terminal uplink capability information and terminal downlink capability information that correspond to the first frequency band, as well as a supplementary uplink frequency band identifier and terminal uplink capability information that corresponds to the supplementary uplink frequency band;

the terminal capability information is reported to a network-side equipment.

Alternatively, the terminal uplink capability information includes at least one of the following types of information of the terminal-side equipment within an uplink operating frequency range:

a terminal transmission power level, a modulation mode supported by the uplink, and the number of layers supported by the uplink multiple-input multiple-output technology.

Alternatively, the terminal downlink capability information includes at least one of the following types of information of the terminal-side equipment in a downlink operating frequency range:

a modulation mode supported by the downlink, and the number of layers supported by the downlink multiple-input multiple-output technology.

Alternatively, the terminal capability information further includes a frequency band pairing combination identifier and at least one of the following types of information corresponding to the frequency band pairing combination:

first information indicating whether the terminal-side equipment supports synchronously performing uplink data transmission within the first uplink operating frequency range and the second uplink operating frequency range;

second information indicating whether the terminal-side equipment supports data reception within the first downlink operating frequency range while performing data transmission within the second uplink operating frequency range;

third information indicating whether the terminal-side equipment shall be configured with a separation when transmitting data within the second uplink operating frequency range, the separation being configured for the terminal-side equipment to transmit an uplink reference signal within the first uplink operating frequency range.

Embodiments of the present disclosure further provides a terminal-side equipment 2, including:

the above-described non-temporary computer readable storage medium 1; and one or more processors configured to implement a program in the above-described non-temporary computer readable storage medium 1.

Embodiments of the present disclosure further provides a non-temporary computer readable storage medium 3 which includes one or more programs configured to implement a method for use in reporting terminal capability. The method is applied to a network-side equipment, including:

terminal capability information of a frequency band pairing combination used by a terminal-side equipment is received, the terminal capability information being sent by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

the terminal-side equipment is scheduled for transmitting uplink data within an uplink operating frequency range within the frequency band pairing combination, and/or receiving downlink data within a downlink operating frequency range in the frequency band pairing combination in accordance with the terminal capability information.

Alternatively, the terminal capability information includes a first frequency band identifier, terminal uplink capability information and terminal downlink capability information corresponding to the first frequency band, as well as a supplementary uplink frequency band identifier and the terminal uplink capability information corresponding to the supplementary uplink frequency band.

That the terminal-side equipment is scheduled for transmitting uplink data within the uplink operating frequency range in the frequency band pairing combination, and/or receiving downlink data within the downlink operating frequency range within the frequency band pairing combination in accordance with the terminal capability information includes:

an uplink scheduling resource is determined according to the terminal uplink capability information, and/or a downlink scheduling resource is determined according to the terminal downlink capability information.

Alternatively, the terminal uplink capability information includes the following information of the terminal-side equipment within the uplink operating frequency range: a terminal transmission power level, a modulation mode supported by the uplink, and the number of layers supported by the uplink multiple-input multiple-output technology.

The uplink scheduling resource includes the following resources: an uplink frequency, a transmission bandwidth, a modulation manner, the number of layers of the multiple-input multiple-output technology, and transmission power.

Alternatively, the terminal downlink capability information includes the following information of the terminal-side equipment in a downlink operating frequency range: a modulation mode supported by the downlink, and the number of layers supported by the downlink multiple-input multiple-output technology.

The downlink scheduling resource includes the following resources: a downlink frequency, a downlink bandwidth, a modulation manner, the number of layers of the multiple-input multiple-output technology.

Alternatively, the terminal capability information further includes the frequency band pairing combination identifier and first information corresponding to the frequency band pairing combination, the first information indicating whether the terminal-side equipment supports synchronously performing uplink data transmission within the first uplink operating frequency range and the second uplink operating frequency range.

That the terminal-side equipment is scheduled for transmitting uplink data within the uplink operating frequency range within the frequency band pairing combination, and/or receiving downlink data within the downlink operating frequency range within the frequency band pairing combination in accordance with the terminal capability information includes:

it is determined that data is able to be synchronously scheduled for the terminal-side equipment within the first uplink operating frequency range and the second uplink operating frequency range, when the first information indicates that the terminal-side equipment supports synchronous uplink data transmission in the first uplink operating frequency range and the second uplink operating frequency range.

Alternatively, that the terminal-side equipment is scheduled for transmitting uplink data within the uplink operating frequency range in the frequency band pairing combination, and/or receiving downlink data within the downlink operating frequency range within the frequency band pairing combination includes in accordance with the terminal capability information:

It is determined that data is not able to be synchronously scheduled for the terminal-side equipment within the first uplink operating frequency range and the second uplink operating frequency range, when the first information indicates that the terminal-side equipment does not support synchronous uplink data transmission in the first uplink operating frequency range and the second uplink operating frequency range.

Alternatively, the terminal capability information further includes the frequency band pairing combination identifier and second information corresponding to the frequency band pairing combination, the second information indicating whether the terminal-side equipment supports data reception within the first downlink operating frequency range while supporting data transmission within the second uplink operating frequency range.

That the terminal-side equipment is scheduled for transmitting uplink data within an uplink operating frequency range within the frequency band pairing combination, and/or receiving downlink data within a downlink operating frequency range in the frequency band pairing combination includes in accordance with the terminal capability information:

it is determined that the terminal-side equipment is able to be scheduled to receive data within the first downlink operating frequency range while terminal-side equipment is performing data transmission within the second uplink operating frequency range, when the second information indicates that the terminal-side equipment supports data reception within the first downlink operating frequency range while performing data transmission within the second uplink operating frequency range.

Alternatively, that the terminal-side equipment is scheduled for transmitting uplink data within an uplink operating frequency range within the frequency band pairing combination, and/or receiving downlink data within a downlink operating frequency range in the frequency band pairing combination in accordance with the terminal capability information includes:

it is determined that the terminal-side equipment is not able to be scheduled to receive data within the first downlink operating frequency range while scheduling the terminal-side equipment to perform data transmission within the second uplink operating frequency range, when the second information indicates that the terminal-side equipment does not support data reception within the first downlink operating frequency range while performing data transmission within the second uplink operating frequency range; or it is determined that the terminal-side equipment is not able to be scheduled to perform data transmission within the second uplink operating frequency range while the terminal-side equipment is scheduled to receive data within the first downlink operating frequency range, when the second information indicates that the terminal-side equipment does not support data reception within the first downlink operating frequency range while performing data transmission within the second uplink operating frequency range.

Alternatively, the terminal capability information further includes the frequency band pairing combination identifier and third information corresponding to the frequency band pairing combination, the third information indicating whether a separation needs to be configured when the terminal-side equipment transmits data within the second uplink operating frequency range, and the separation being configured for the terminal-side equipment to transmit an uplink reference signal within the first uplink operating frequency range.

That the terminal-side equipment is scheduled for transmitting uplink data within an uplink operating frequency range in the frequency band pairing combination, and/or receiving downlink data within a downlink operating frequency range within the frequency band pairing combination in accordance with the terminal capability information includes:

it is determined that the separation needs to be configured when the terminal-side equipment transmits data within the second uplink operating frequency range, if the third information indicates that the separation needs to be configured when the terminal-side equipment transmits data within the second uplink operating frequency range, wherein in a time window of the separation, the terminal-side equipment transmits an uplink reference signal within the first uplink operating frequency range but stops transmitting data within the second uplink operating frequency range.

Alternatively, that the terminal-side equipment is scheduled for transmitting uplink data within an uplink operating frequency range in the frequency band pairing combination, and/or downlink data is received within a downlink operating frequency range in the frequency band pairing combination in accordance with the terminal capability information includes:

it is determined that the separation does not need to be configured when the terminal-side equipment transmits data within the second uplink operating frequency range, if the third information indicates that the separation does not need to be configured when the terminal-side equipment transmits data within the second uplink operating frequency range.

Embodiments of the present disclosure further discloses a network-side equipment, including:

the above-described non-temporary computer readable storage medium 3; and one or more processors which are configured to implement a program in the non-temporary computer readable storage medium 3.

Preferable embodiments of the present disclosure are described in detail with reference to the accompanying drawings. However, the present disclosure is not limited to the details in the embodiments. Within the technical inventive concept of the present disclosure, the technical solutions of the present disclosure may be varied in multiple ways and the variations fall into the protection scope of the present disclosure.

It shall be noted that the specific technical features described in the above-described embodiments may be combined in appropriate ways without contradicting against each other. In order to avoid repetition, the various possible combinations will not be described in the present disclosure.

Further, the various embodiments in the present disclosure may also be combined randomly and shall be deemed to be content disclosed by the present disclosure as long as they do not depart from the concept of the present disclosure.

What is claimed is:

1. A method for use in reporting terminal capability, wherein the method is applied to a terminal-side equipment, and the method comprises:
    determining a frequency band pairing combination in an operating band that is supported by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;
    determining terminal capability information of the terminal-side equipment in the frequency band pairing combination, wherein the terminal capability information comprises a first frequency band identifier, terminal uplink capability information and terminal downlink capability information that correspond to the first frequency band, as well as a supplementary uplink frequency band identifier and terminal uplink capability information that corresponds to the supplementary uplink frequency band;
    reporting the terminal capability information to a network-side equipment,
    wherein, the terminal capability information further comprises a frequency band pairing combination identifier and at least one of the following types of information corresponding to the frequency band pairing combination:
    first information indicating whether the terminal-side equipment supports synchronously performing uplink data transmission within the first uplink operating frequency range and the second uplink operating frequency range;
    second information indicating whether the terminal-side equipment supports data reception within the first downlink operating frequency range while performing data transmission within the second uplink operating frequency range;
    third information indicating whether the terminal-side equipment needs to configure with a separation when transmitting data within the second uplink operating frequency range, the separation being configured for the terminal-side equipment to transmit an uplink reference signal within the first uplink operating frequency range.

2. The method according to claim 1, wherein the terminal uplink capability information comprises at least one of the following types of information of the terminal-side equipment within an uplink operating frequency range:
a terminal transmission power level, a modulation mode supported by the uplink, and the number of layers supported by an uplink multiple-input multiple-output technology.

3. The method according to claim 1, wherein the terminal downlink capability information comprises at least one of the following types of information of the terminal-side equipment within a downlink operating frequency range:
a modulation mode supported by the downlink, and the number of layers supported by a downlink multiple-input multiple-output technology.

4. A method for use in reporting terminal capability, wherein the method is applied to a network-side equipment, and the method comprises:
receiving terminal capability information of a frequency band pairing combination used by a terminal-side equipment, the terminal capability information being sent by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;
scheduling the terminal-side equipment for: transmitting uplink data within an uplink operating frequency range in the frequency band pairing combination, and/or receiving downlink data within a downlink operating frequency range in the frequency band pairing combination in accordance with the terminal capability information,
wherein, the terminal capability information further comprises a frequency band pairing combination identifier and at least one of the following types of information corresponding to the frequency band pairing combination:
first information indicating whether the terminal-side equipment supports synchronously performing uplink data transmission within the first uplink operating frequency range and the second uplink operating frequency range;
second information indicating whether the terminal-side equipment supports data reception within the first downlink operating frequency range while supporting data transmission within the second uplink operating frequency range;
third information indicating whether a separation needs to be configured when the terminal-side equipment transmits data within the second uplink operating frequency range, and the separation being configured for the terminal-side equipment to transmit an uplink reference signal within the first uplink operating frequency range.

5. The method according to claim 4, wherein the terminal capability information comprises a first frequency band identifier, terminal uplink capability information and terminal downlink capability information corresponding to the first frequency band, as well as a supplementary uplink frequency band identifier and terminal uplink capability information corresponding to the supplementary uplink frequency band;
the step of scheduling the terminal-side equipment for transmitting uplink data within the uplink operating frequency range in the frequency band pairing combination, and/or receiving downlink data within the downlink operating frequency range in the frequency band pairing combination in accordance with the terminal capability information comprises:
determining an uplink scheduling resource according to the terminal uplink capability information, and/or determining a downlink scheduling resource according to the terminal downlink capability information.

6. The method according to claim 5, wherein the terminal uplink capability information comprises the following information of the terminal-side equipment within the uplink operating frequency range: a terminal transmission power level, a modulation mode supported by the uplink, and the number of layers supported by an uplink multiple-input multiple-output technology;
the uplink scheduling resource comprises the following resources: an uplink frequency, a transmission bandwidth, a modulation manner, the number of layers of a multiple-input multiple-output technology, and transmission power.

7. The method according to claim 5, wherein the terminal downlink capability information comprises the following information of the terminal-side equipment in a downlink operating frequency range: a modulation mode supported by the downlink, and the number of layers supported by a downlink multiple-input multiple-output technology;
the downlink scheduling resource comprises the following resources: a downlink frequency, a downlink bandwidth, a modulation manner, the number of layers of a multiple-input multiple-output technology.

8. The method according to claim 4, wherein
the step of scheduling the terminal-side equipment for transmitting uplink data within the uplink operating frequency range in the frequency band pairing combination, and/or receiving downlink data within the downlink operating frequency range in the frequency band pairing combination in accordance with the terminal capability information comprises:
determining that data is able to be synchronously scheduled for the terminal-side equipment within the first uplink operating frequency range and the second uplink operating frequency range, when the first information indicates that the terminal-side equipment supports synchronous uplink data transmission in the first uplink operating frequency range and the second uplink operating frequency range.

9. The method according to claim 8, wherein the step of scheduling the terminal-side equipment for transmitting uplink data within the uplink operating frequency range within the frequency band pairing combination, and/or receiving downlink data within the downlink operating frequency range in the frequency band pairing combination in accordance with the terminal capability information comprises:
determining that data is not able to be synchronously scheduled for the terminal-side equipment within the first uplink operating frequency range and the second uplink operating frequency range, when the first information indicates that the terminal-side equipment does not support synchronous uplink data transmission in the first uplink operating frequency range and the second uplink operating frequency range.

10. The method according to claim 4, wherein,
the step of scheduling the terminal-side equipment for transmitting uplink data within an uplink operating frequency range in the frequency band pairing combination, and/or receiving downlink data within a downlink operating frequency range in the frequency band pairing combination in accordance with the terminal capability information comprises:

determining that the terminal-side equipment is able to be scheduled to receive data within the first downlink operating frequency range while terminal-side equipment is performing data transmission within the second uplink operating frequency range, when the second information indicates that the terminal-side equipment supports data reception within the first downlink operating frequency range while performing data transmission within the second uplink operating frequency range.

11. The method according to claim 10, wherein the step of scheduling the terminal-side equipment for transmitting uplink data within an uplink operating frequency range in the frequency band pairing combination, and/or receiving downlink data within a downlink operating frequency range in the frequency band pairing combination in accordance with the terminal capability information comprises:

determining that the terminal-side equipment is not able to be scheduled to receive data within the first downlink operating frequency range while scheduling the terminal-side equipment to perform data transmission within the second uplink operating frequency range; or determining that the terminal-side equipment is not able to be scheduled to perform data transmission within the second uplink operating frequency range while the terminal-side equipment is scheduled to receive data within the first downlink operating frequency range, when the second information indicates that the terminal-side equipment does not support data reception within the first downlink operating frequency range while performing data transmission within the second uplink operating frequency range.

12. The method according to claim 4, wherein, the step of scheduling the terminal-side equipment for transmitting uplink data within an uplink operating frequency range in the frequency band pairing combination, and/or receiving downlink data within a downlink operating frequency range in the frequency band pairing combination in accordance with the terminal capability information comprises:

determining that the separation needs to be configured when the terminal-side equipment transmits data within the second uplink operating frequency range, when the third information indicates that the separation needs to be configured while the terminal-side equipment transmits data within the second uplink operating frequency range; wherein in a time window of the separation, the terminal-side equipment transmits an uplink reference signal within the first uplink operating frequency range but stops transmitting data within the second uplink operating frequency range.

13. The method according to claim 12, wherein the step of scheduling the terminal-side equipment for transmitting uplink data within an uplink operating frequency range within the frequency band pairing combination, and/or receiving downlink data within a downlink operating frequency range in the frequency band pairing combination in accordance with the terminal capability information comprises:

determining that the separation does not need to be configured when the terminal-side equipment transmits data within the second uplink operating frequency range, when the third information indicates that the separation does not need to be configured while the terminal-side equipment transmits data within the second uplink operating frequency range.

14. A terminal-side equipment, comprising a memory and a processor; wherein the memory is configured to store a computer program, which, when executed by the processor, cause the processor to perform a method comprising:

determining a frequency band pairing combination in an operating band that is supported by the terminal-side equipment, wherein the frequency band pairing combination is jointly composed of a first frequency band that consists of a first uplink operating frequency range and a first downlink operating frequency range as well as a supplementary uplink frequency band that consists of one or more second uplink frequency ranges;

determining terminal capability information of the terminal-side equipment in the frequency band pairing combination, wherein the terminal capability information comprises a first frequency band identifier, terminal uplink capability information and terminal downlink capability information that correspond to the first frequency band, as well as a supplementary uplink frequency band identifier and terminal uplink capability information that corresponds to the supplementary uplink frequency band;

reporting the terminal capability information to a network-side equipment, wherein the terminal capability information further comprises a frequency band pairing combination identifier and at least one of the following types of information corresponding to the frequency band pairing combination:

first information indicating whether the terminal-side equipment supports synchronously performing uplink data transmission within the first uplink operating frequency range and the second uplink operating frequency range;

second information indicating whether the terminal-side equipment supports data reception within the first downlink operating frequency range while performing data transmission within the second uplink operating frequency range;

third information indicating whether the terminal-side equipment needs to configure with a separation when transmitting data within the second uplink operating frequency range, the separation being configured for the terminal-side equipment to transmit an uplink reference signal within the first uplink operating frequency range.

15. The terminal-side equipment according to claim 14, wherein the terminal uplink capability information comprises at least one of the following types of information of the terminal-side equipment within an uplink operating frequency range:

a terminal transmission power level, a modulation mode supported by the uplink, and the number of layers supported by an uplink multiple-input multiple-output technology.

16. The terminal-side equipment according to claim 14, wherein the terminal downlink capability information comprises at least one of the following types of information of the terminal-side equipment within a downlink operating frequency range:

a modulation mode supported by the downlink, and the number of layers supported by a downlink multiple-input multiple-output technology.

* * * * *

UNITED STATES PATENT AND TRADEMARK OFFICE
CERTIFICATE OF CORRECTION

PATENT NO. : 11,006,270 B2
APPLICATION NO. : 16/542390
DATED : May 11, 2021
INVENTOR(S) : William Xiao-qing Huang, Zhengkai Wang and Haitao Jiang Page 1 of 1

It is certified that error appears in the above-identified patent and that said Letters Patent is hereby corrected as shown below:

On the Title Page (71) Applicant should read: CLOUDMINDS ROBOTICS CO., LTD., Shanghai (CN)

(73) Assignee should read: CLOUDMINDS ROBOTICS CO., LTD., Shanghai (CN)

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*